(12) United States Patent
Lin et al.

(10) Patent No.: US 7,498,533 B1
(45) Date of Patent: Mar. 3, 2009

(54) KEYPAD DEVICE

(75) Inventors: Min-Xian Lin, Miaoli County (TW); Chen-Hua Huang, Taipei (TW)

(73) Assignees: Silitek Electronic(Guangzhou)Co.,Ltd., Guangzhou high and new technology industry development zone, Guangzhou (CN); Lite-On Technology Corp., Neihu, Taipei (TW)

( * ) Notice: Subject to any disclaimer, the term of this patent is extended or adjusted under 35 U.S.C. 154(b) by 0 days.

(21) Appl. No.: 12/037,944

(22) Filed: Feb. 27, 2008

(51) Int. Cl.
*H01H 9/18* (2006.01)

(52) U.S. Cl. ............... 200/310; 200/314; 200/317

(58) Field of Classification Search ........... 200/512, 200/516, 517, 310–317
See application file for complete search history.

(56) References Cited

U.S. PATENT DOCUMENTS

| | | | | |
|---|---|---|---|---|
| 5,703,625 A * | 12/1997 | Snider et al. | ............... | 345/168 |
| 5,940,215 A * | 8/1999 | Rudisill et al. | ............... | 359/599 |
| 6,359,668 B1 * | 3/2002 | Iijima et al. | ............... | 349/61 |
| 6,456,279 B1 * | 9/2002 | Kubo et al. | ............... | 345/173 |
| 6,550,927 B1 * | 4/2003 | Messel | ............... | 362/24 |
| 7,318,664 B2 * | 1/2008 | Hatanaka et al. | ............... | 362/555 |
| 7,335,844 B2 * | 2/2008 | Lee et al. | ............... | 200/310 |
| 7,378,606 B2 * | 5/2008 | Lee et al. | ............... | 200/314 |
| 7,423,229 B2 * | 9/2008 | Chen | ............... | 200/314 |
| 7,446,274 B2 * | 11/2008 | Choi et al. | ............... | 200/310 |

* cited by examiner

*Primary Examiner*—Michael A Friedhofer
(74) *Attorney, Agent, or Firm*—Winston Hsu

(57) ABSTRACT

A keypad device includes a keypad with a plurality of keys in a defined order, and a light guide plate disposed under the keypad. The light guide plate includes a plurality of patterns formed by a method of printing on a surface thereof, and each pattern includes adhesive material and reflective material. The keypad device further includes at least one LED lamp disposed beside the light guide plate.

11 Claims, 9 Drawing Sheets

KEYPAD DEVICE

BACKGROUND OF THE INVENTION

1. Field of the Invention

The present invention relates to a keypad device of an electronic product, and more particularly, to a keypad device with a modularized backlight module.

2. Description of the Prior Art

A keypad with backlight function of an electronic device is widely used currently. Keys of the keypad can emit light when being triggered so that a user can press right keys in a dark situation. Please refer to FIG. 1. FIG. 1 is a perspective front view of a keypad device 1 in the prior art. The keypad device 1 includes a plurality of keys 11, and a plurality of light emitting diode (LED) lamps 12 for emitting light so as to assist the user in using the keys 11 in the dark situation.

As shown in FIG. 1, the LED lamps 12 are distributed among the keys 11. However, it has a disadvantage of light nonuniformity because light emitted from each LED lamp 12 weakens with increasing emitting distance accordingly so that visual quality is reduced.

An assembly backlight module substitutes for the simply LED lamp to solve the above-mentioned problem. A light guide plate of the backlight module is for guiding light so as to increase luminance and light uniformity of a display panel. Please refer to FIG. 2. FIG. 2 is a diagram of a light guide plate 22 in the prior art. A light source 21 is disposed on a lateral side of the light guide plate 22. Light emitted from the light source 21 enters the light guide plate 22 laterally and reflects inside the light guide plate 22 repeatedly for proceeding in a direction opposite to the light source 21. The light can scatter so as to emit out of a surface of the light guide plate 22 by a pattern 23 formed on the light guide plate 22. The pattern 23 on the light guide plate 22 can be formed at a printing method or an etching method.

Please refer to FIG. 3. FIG. 3 is a diagram of the light guide plate 22 utilized in a mobile phone in the prior art. The light guide plate 22 can be utilized in a backlight module of a keypad of the mobile phone. An Adhesive 33 is disposed on a side with the pattern 23 of the light guide plate 22 for adhering a dome sheet 34. A surface 341 of the dome sheet includes adhesive material for adhering a metal dome 35 so as to connect with a printed circuit board (PCB) 36. The manufacturing method of layer disposition causes difficulty in manufacture, and the mobile phone can not form in a thin type.

SUMMARY OF THE INVENTION

It is therefore a primary objective of the claimed invention to provide a keypad device with a modularized backlight module for solving the above-mentioned problem.

According to the claimed invention, a keypad device includes a keypad with a plurality of keys in a defined order, and a light guide plate disposed under the keypad. The light guide plate includes a plurality of patterns formed by a method of printing on a surface thereof, and each pattern includes adhesive material and reflective material. The keypad device further includes at least one LED lamp disposed beside the light guide plate.

According to the claimed invention, the light guide plate includes a board or a film.

According to the claimed invention, the board is made of polymethylmethacrylate (PMMA) material.

According to the claimed invention, the film is made of polycarbonate (PC) material or polyethylene terephthalate (PET) material.

According to the claimed invention, the adhesive material is glue.

According to the claimed invention, the reflective material is made of $SiO_2$ or $TiO_2$.

According to the claimed invention, the plurality of patterns are located corresponding to the defined order of the plurality of keys.

According to the claimed invention, the keypad device further includes a plurality of metal domes disposed on a side of the light guide plate opposite to the keypad and located in positions corresponding to the plurality of keys.

According to the claimed invention, the keypad device further includes a protective layer disposed between the light guide and the plurality of metal domes for preventing the plurality of metal domes from damaging the light guide plate.

According to the claimed invention, the keypad device further includes a printed circuit board wherein the keypad, the light guide plate, the protective layer, the plurality of metal domes, and the printed circuit board are packed as a whole from top to bottom.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
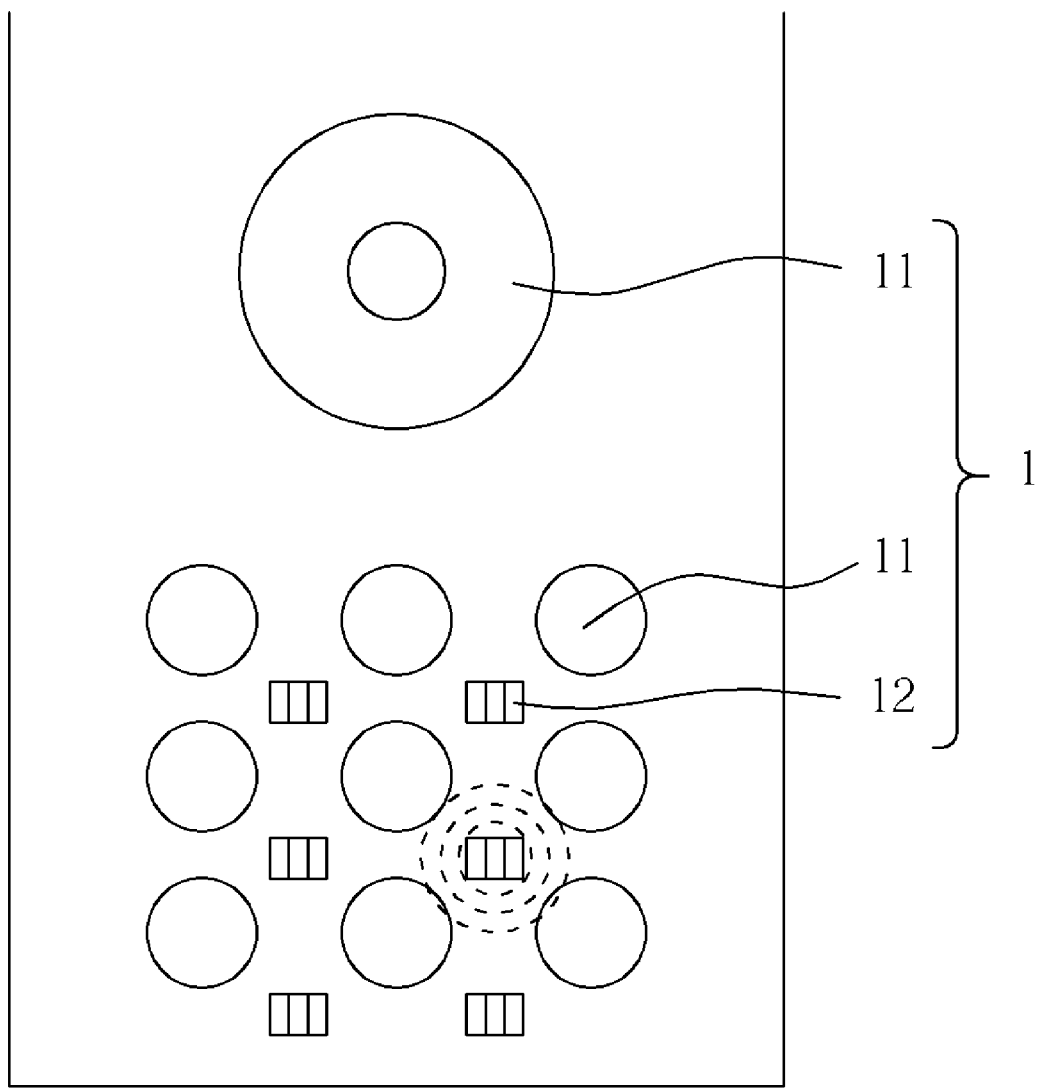
FIG. 1 is a perspective front view of a keypad device in the prior art.
Figure 2:
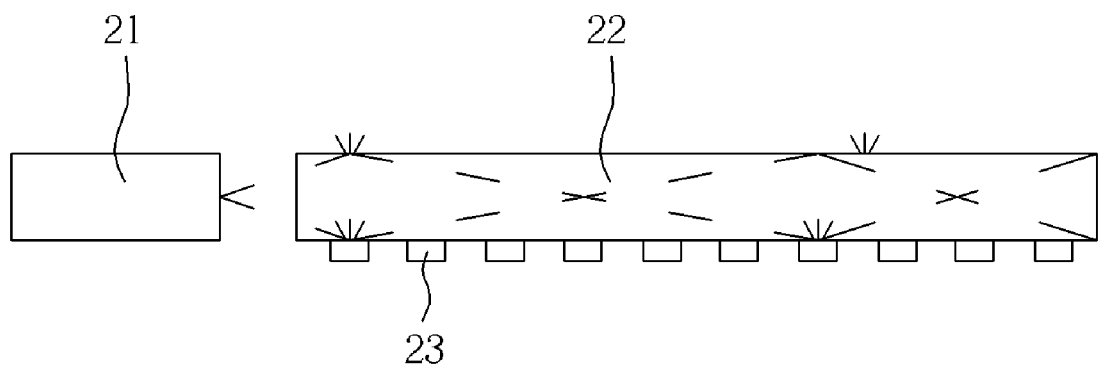
FIG. 2 is a diagram of a light guide plate in the prior art.
Figure 3:
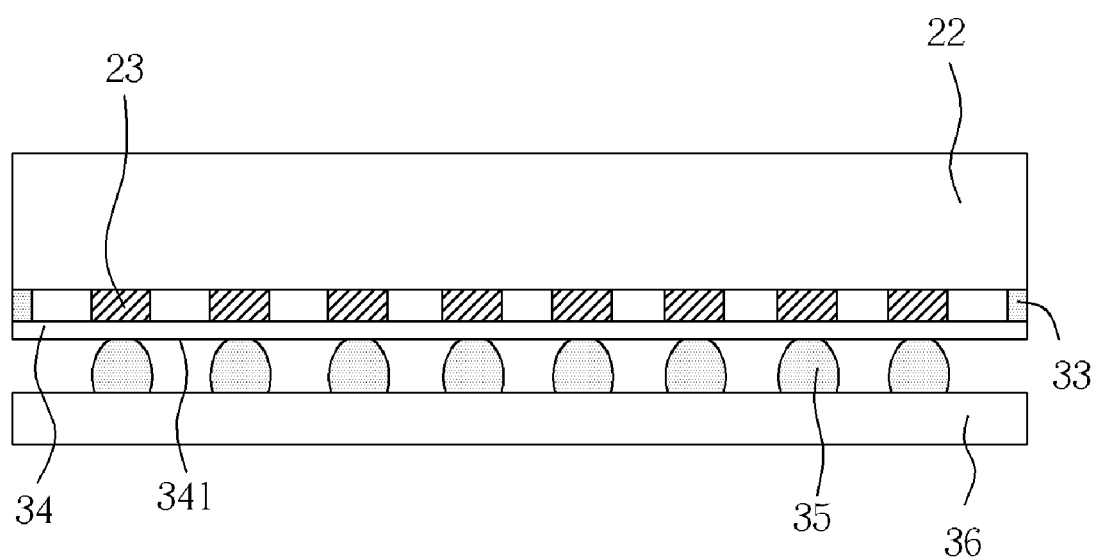
FIG. 3 is a diagram of the light guide plate utilized in a mobile phone in the prior art.
Figure 4:
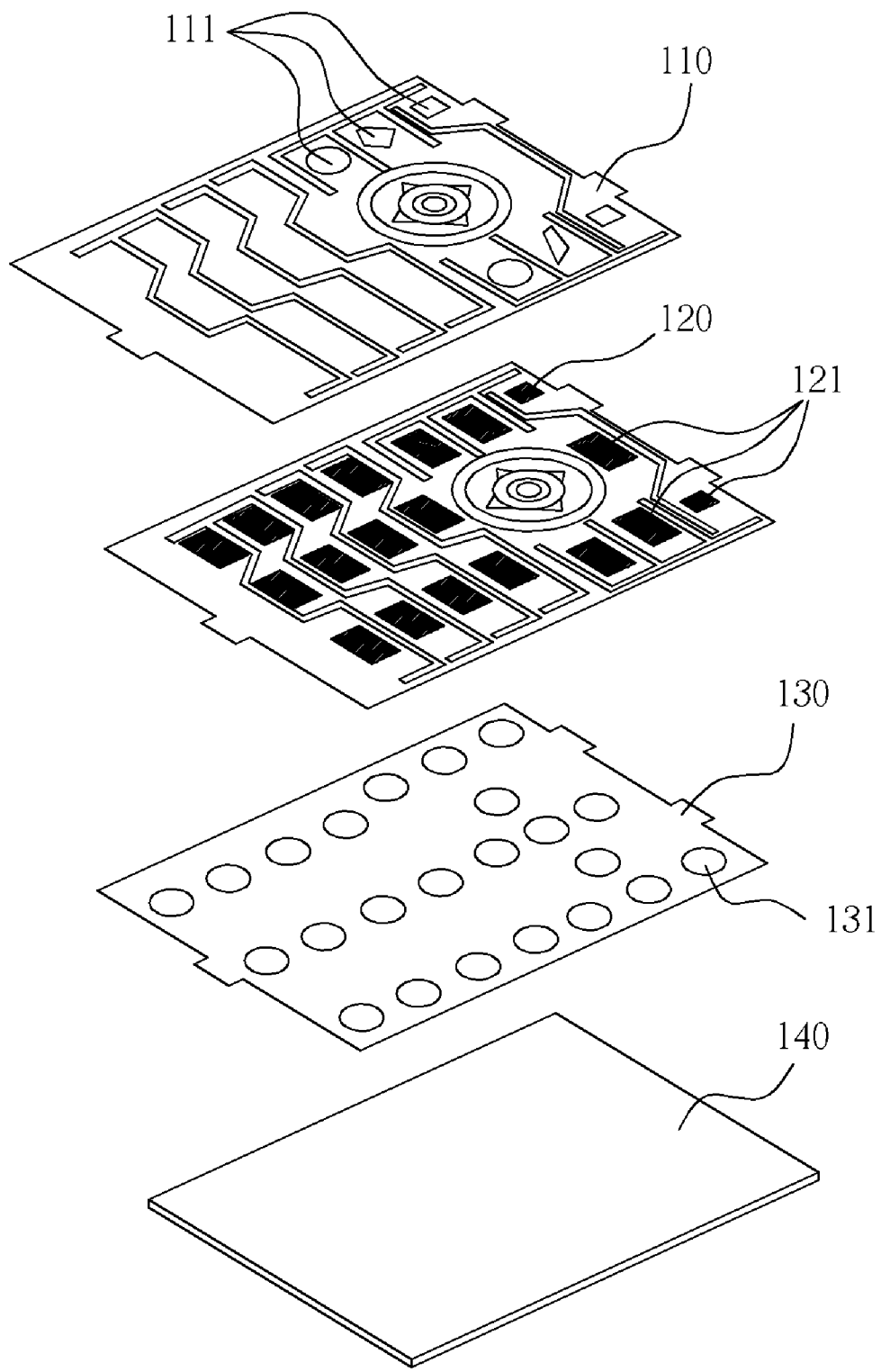
FIG. 4 is an exploded drawing of a keypad device according to an embodiment of the present invention.
Figure 5:
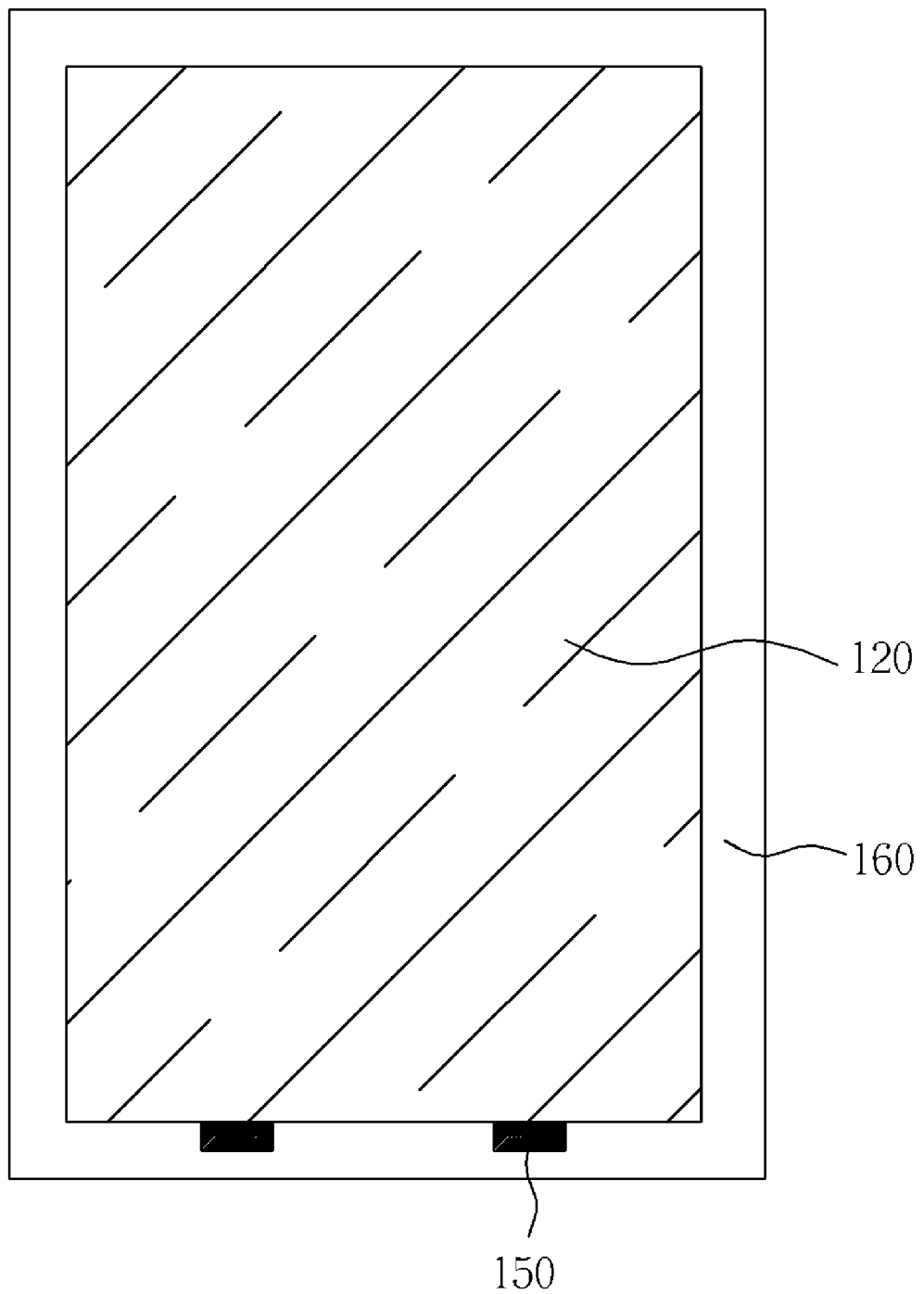
FIG. 5 is a front view of the keypad device excluding a keypad according to the embodiment of the present invention.

Please refer to FIG. 4. FIG. 4 is an exploded drawing of a keypad device according to an embodiment of the present invention. The keypad device includes a keypad 110 including a plurality of keys 111, and a light guide plate 120. A plurality of patterns 121 is formed on a surface of the light guide plate 120. At least one LED lamp 150 is disposed on a lateral side of the light guide plate 120 as shown in FIG. 5. The keypad device further includes a metal dome layer 130 on which a plurality of metal domes 131 is disposed and located in positions corresponding to the plurality of patterns 121 and the plurality of keys 111. The keypad device further includes a printed circuit board 140. The keypad 110, the light guide plate 120, the metal dome layer 130, and the printed circuit board 140 are disposed from top to bottom as a order shown in FIG. 4. Please refer to FIG. 5. FIG. 5 is a front view of the keypad device excluding the keypad 110 according to the embodiment of the present invention. Two LED lamps 150 are disposed on a lateral side of the light guide plate 120. A number of the LED lamps 150 and position of the LED lamps 150 are not limited. For example, the LED lamps 150 can be disposed on other lateral side of the light guide plate 120 or on a plurality of lateral sides simultaneously.

Figure 6:
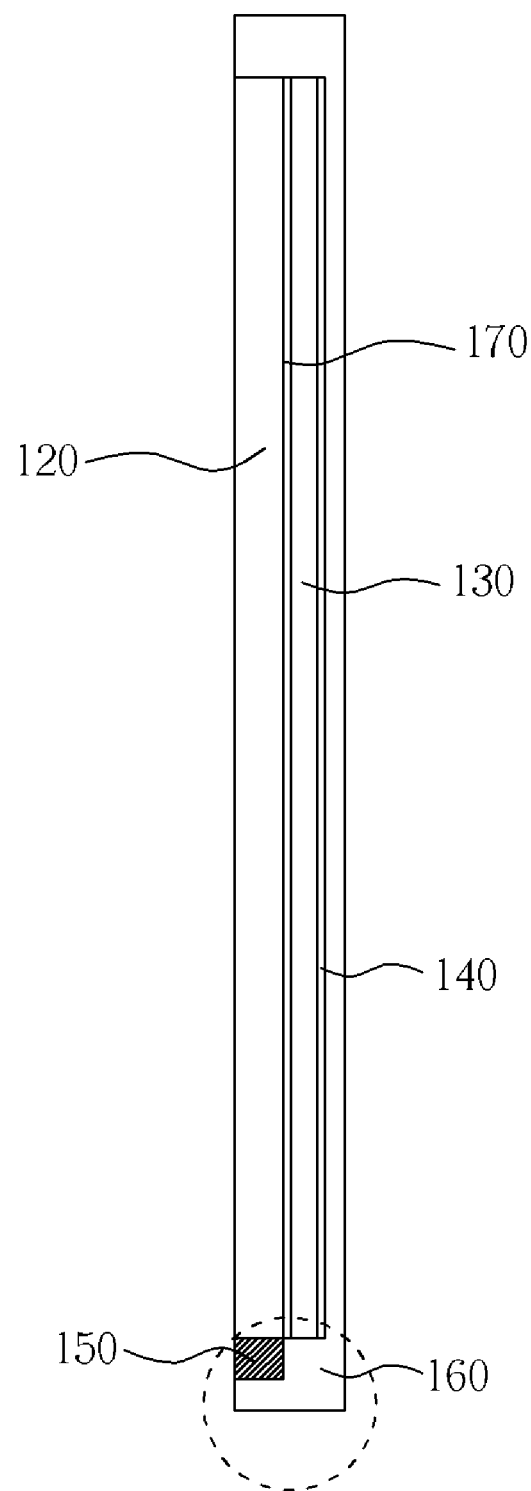
FIG. 6 is a lateral view of the keypad device excluding the keypad according to the embodiment of the present invention.
Figure 7:
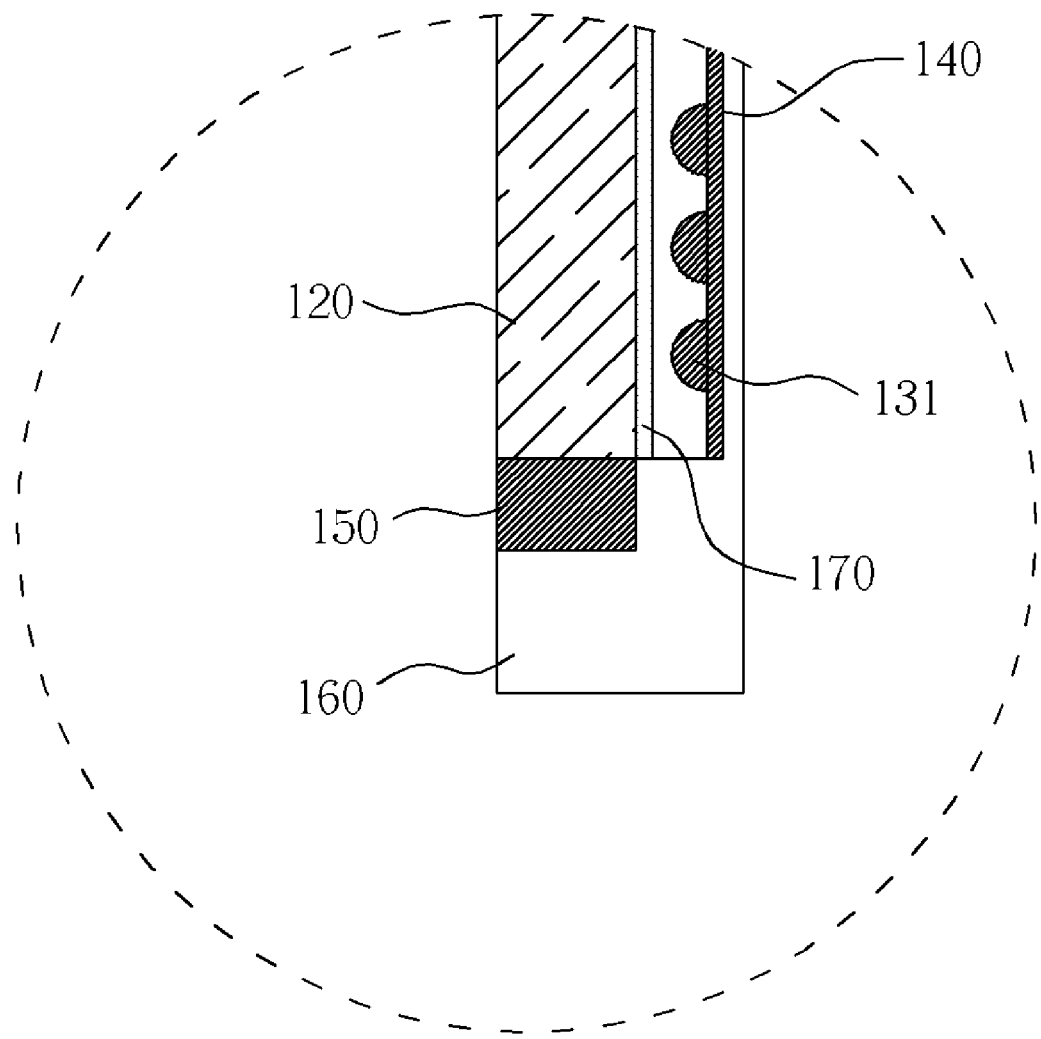
FIG. 7 is a local enlarged diagram of the keypad device excluding the keypad according to the embodiment of the present invention.

Please refer to FIG. 6 and FIG. 7. FIG. 6 is a lateral view of the keypad device excluding the keypad 110 according to the embodiment of the present invention. FIG. 7 is a local enlarged diagram of the keypad device excluding the keypad 110 according to the embodiment of the present invention. The light guide plate 120, the metal dome layer 130, and the printed circuit board 140 are packed by a base 160 as a whole from top to bottom. A protective layer 170 is disposed between the light guide 120 and the metal dome layer 130 selectively for preventing the metal domes 131 on the metal dome layer 130 from damaging the patterns 121 on the light guide plate 120. The light guide plate 120, the protective layer 170, the metal dome layer 130, and the printed circuit board 140 are packed by the base 160 as a whole from top to bottom.

Figure 8:
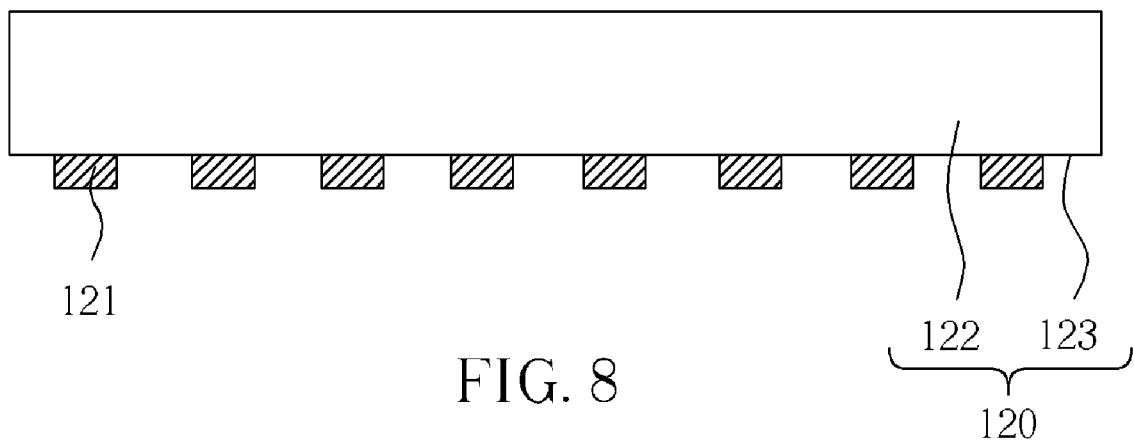
FIG. 8 is a diagram of a light guide plate according to the embodiment of the present invention.

Please refer to FIG. 8. FIG. 8 is a diagram of the light guide plate 120 according to the embodiment of the present invention. The light guide plate 120 includes a substrate 122, and the plurality of patterns 121 formed on a surface 123 of the substrate 122 at a printing method. Each pattern 121 includes adhesive material and reflective material.

The substrate 122 can be a board made of polymethylmethacrylate (PMMA) material. The substrate 122 also can be a film made of polycarbonate (PC) material or polyethylene terephthalate (PET) material. The substrate 122 can be made of any material with high optical transmission. The adhesive material can be glue, and so on. The reflective material can be made of $SiO_2$ or $TiO_2$, and so on.

Figure 9:
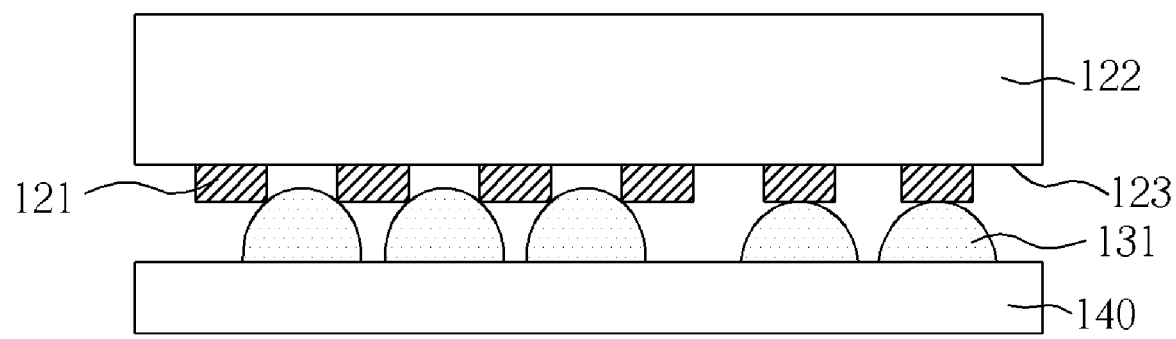
FIG. 9 is a diagram illustrating combination of the light guide plate and the metal domes according to the embodiment of the present invention.

Please refer to FIG. 9. FIG. 9 is a diagram illustrating combination of the light guide plate 120 and the metal domes 131 according to the embodiment of the present invention. Because the patterns 121 include the adhesive material, the metal domes 131 can be attached to the patterns 121 by the adhesive material directly. Then the metal domes 131 are connected to the printed circuit board 140.

The keypad device with the modularized backlight module can be utilized in any portable apparatus, such as a mobile phone, a personal digital assistant (PDA), a global positioning system (GPS) apparatus, a digital video recorder, a portable digital versatile disc (portable DVD) player, a notebook computer, and so on. The keypad device with the simplified backlight module of the present invention is modularized so as to simplify manufacture procedure and thin the portable apparatus thereof.

In contrast to the prior art, the keypad device with the light guide plate of the present invention is modularized so as to simplify manufacture procedure. The pattern on the light guide plate includes the adhesive material to attach the metal dome so as to simplify manufacture procedure. In addition, the pattern on the light guide plate includes the reflective material to enhance luminance of the keypad so as to reduce backlight sources, such as LED lamps, for energy saving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keypad device comprising:
a keypad with a plurality of keys in a defined order;
a light guide plate disposed under the keypad, the light guide plate comprising a plurality of patterns formed by a method of printing on a surface thereof, and each pattern comprising adhesive material and reflective material; and
at least one LED lamp disposed beside the light guide plate.

2. The keypad device of claim 1 wherein the light guide plate comprises a board or a film.

3. The keypad device of claim 2 wherein the board is made of polymethylmethacrylate (PMMA) material.

4. The keypad device of claim 2 wherein the film is made of polycarbonate (PC) material or polyethylene terephthalate (PET) material.

5. The keypad device of claim 1 wherein the adhesive material is glue.

6. The keypad device of claim 1 wherein the reflective material is made of $SiO_2$ or $TiO_2$.

7. The keypad device of claim 1 wherein the plurality of patterns are located corresponding to the defined order of the plurality of keys.

8. The keypad device of claim 1 further comprising a plurality of metal domes disposed on a side of the light guide plate opposite to the keypad and located in positions corresponding to the plurality of keys.

9. The keypad device of claim 8 further comprising a protective layer disposed between the light guide and the plurality of metal domes for preventing the plurality of metal domes from damaging the light guide plate.

10. The keypad device of claim 9 further comprising a printed circuit board wherein the keypad, the light guide plate, the protective layer, the plurality of metal domes, and the printed circuit board are packed as a whole from top to bottom.

11. The keypad device of claim 8 further comprising a printed circuit board wherein the keypad, the light guide plate, the plurality of metal domes, and the printed circuit board are packed as a whole from top to bottom.

* * * * *